L. HAVERSTICK.
Horse Hay Fork.
No. 68,873.
Patented Sept. 17, 1867.
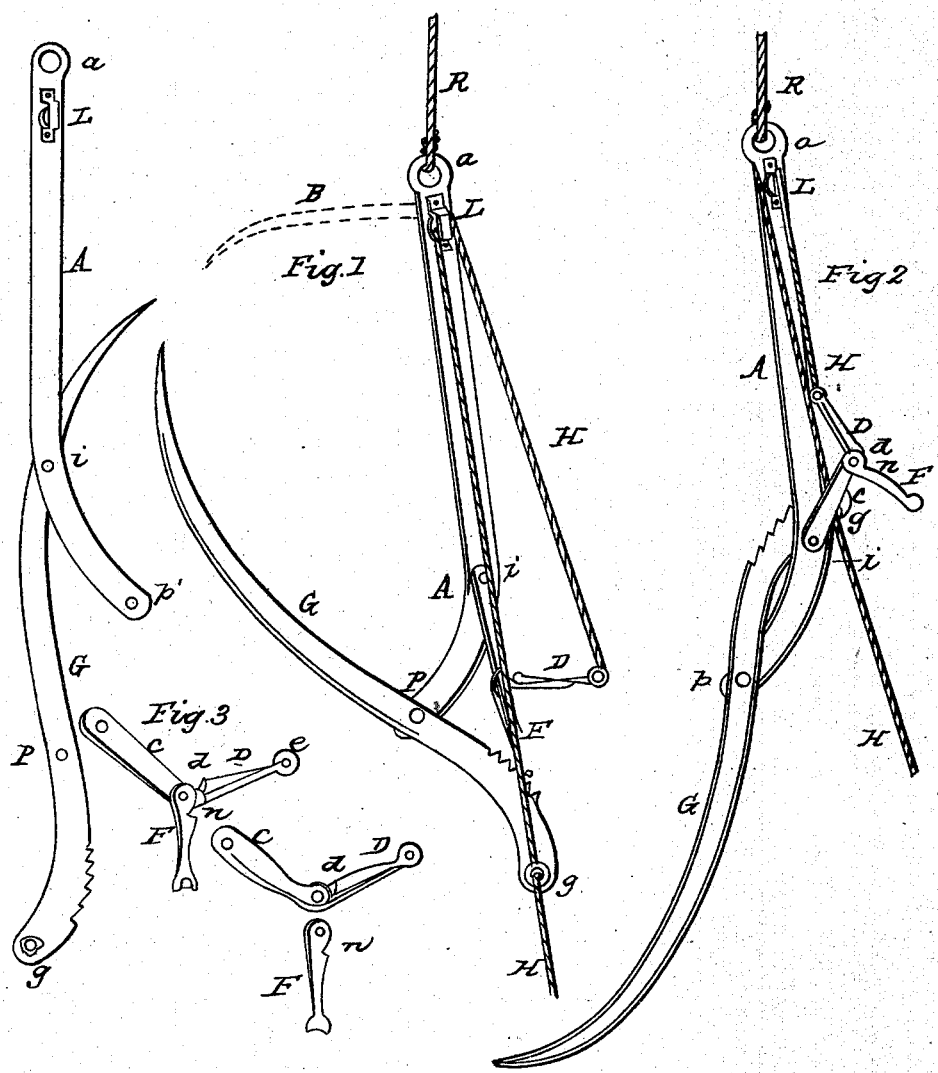

United States Patent Office.

LEVI HAVERSTICK, OF MANNOR TOWNSHIP, PENNSYLVANIA.

*Letters Patent No. 68,873, dated September 17, 1867.*

IMPROVEMENT IN HORSE HAY-FORKS.

The Schedule referred to in these Letters Patent and making part of the same.

TO ALL WHOM IT MAY CONCERN:

Be it known that I, LEVI HAVERSTICK, of Mannor township, in the county of Lancaster, and State of Pennsylvania, have invented a new and useful Combination on a Hay-Fork or Elevator; and I do hereby declare that the following is a full, clear, and exact description of the construction and operation of the same, reference being had to the accompanying drawings, making a part of this specification, in which—

Figure 1 is a view of the combined parts when elevating the hay or the like grasped between the tine and hoisting-arm, with the ratchet-latch set.

Figure 2, the same disengaged and in the act of being discharged of its load and ready to be thrust in for a fresh load.

Figure 3, the parts combined, constituting the lock-click and elbowed latch. The tine, hoisting-arm, &c., are also separately shown detached.

The nature of my invention is in the combination of the four parts by rivets, in a manner to secure strength, simplicity, and a certainty in its action for firmly grasping and holding and freely discharging its contents.

To enable others skilled in the art to make and use my invention, a brief explanation will suffice, as the drawings clearly illustrate all the parts.

A is a wrought-iron bar, say thirty-two inches long, one and three-fourths wide, and of sufficient thickness. This hoisting-bar A has an eye, $a$, at its upper end, and a side bracket, L, for a pulley. The lower end is curved and connected by a rivet to the tine G, at eleven and a half inches in from the end, (in a straight line,) curved and provided with a series of ratchet-teeth on the convex face. The remainder of the tine, say twenty-six inches, is gradually tapered to a point and curved, as shown. The ratchet end is provided with an eye or ring for the passage of the cord H used for discharging the fork or hook. The appliances for locking and unlocking consist in the use of an elbowed latch; the end C, connected by a rivet to the bar A at $i$, (nine inches from the pivot P,) having a raised shoulder, $d$, near the angle on the leg D, which is terminated by an eye for the cord attachment; the parts C D being bent nearly at right angles to each other, in the angle of which the click F is attached by a pivot. This click has a notch, $n$, to receive the shoulder $d$ when brought into a straight line with C, and its edged and flanged terminus fixed in the ratchet-teeth of the end of the tine G firmly locking the parts when filled with hay or the like compressed between the tine and hoisting-bar. To disengage the same, a cord, H, is affixed to the eye $e$ on the latch, and carried up through the pulley L and down through the eye $g$ on the lower end of the tine, the main or hoisting-rope R being attached to the eye $a$ of the hoisting-bar A.

The operation is the same as in numerous patents of this class, and the principle the same, but differs in the practical mode of carrying the principle into actual effect, from others, in the combination and arrangement of its parts. Fig. 1 shows an additional hook, B, by dotted lines. The tine G might also be made double or triple, without otherwise changing the arrangement, and might be deemed an improvement upon my simple single tine; but experience has satisfied me that this simple arrangement will grasp and hold as much as a horse can raise at one time.

I am aware of the numerous patents already granted for hay-elevators, (no less than twenty-two in the year 1864 alone,) but I am not aware that any one device is substantially like mine, be their merits what they may. I have fairly tested this, and know its utility and simplicity meet with favor among my farmer friends and neighbors for the satisfactory results produced.

What I claim as my invention, and desire to secure by Letters Patent, is—

The arrangement of the hoisting-arm A with its eye $a$, pulley L, with or without the spur-tooth B, together with the elbowed latch C D and notched click F, in combination with the tine or tines G and ratcheted terminus and eye $g$, held together by rivets, and operated substantially in the manner and for the purpose specified.

LEVI HAVERSTICK.

Witnesses:
JOHN A. BRUSH,
JESSE T. FRENCH.